United States Patent

Pytlarz et al.

(10) Patent No.: US 9,729,801 B2
(45) Date of Patent: Aug. 8, 2017

(54) BLENDING IMAGES USING MISMATCHED SOURCE AND DISPLAY ELECTRO-OPTICAL TRANSFER FUNCTIONS

(71) Applicant: Dolby Laboratories Licensing Corporation, San Francisco, CA (US)

(72) Inventors: Jaclyn Anne Pytlarz, Sunnyvale, CA (US); Robin Atkins, Campbell, CA (US)

(73) Assignee: Dolby Laboratories Licensing Corporation, San Francisco, CA (US)

(\*) Notice: Subject to any disclaimer, the term of this patent is extended or adjusted under 35 U.S.C. 154(b) by 22 days.

(21) Appl. No.: 14/863,621

(22) Filed: Sep. 24, 2015

(65) Prior Publication Data

US 2016/0100108 A1   Apr. 7, 2016

Related U.S. Application Data

(60) Provisional application No. 62/059,038, filed on Oct. 2, 2014.

(51) Int. Cl.
*H04N 9/70* (2006.01)
*H04N 5/265* (2006.01)
(Continued)

(52) U.S. Cl.
CPC ............. *H04N 5/265* (2013.01); *G06T 5/009* (2013.01); *G06T 5/50* (2013.01); *G09G 5/026* (2013.01);
(Continued)

(58) Field of Classification Search
CPC .... G11B 27/036; H04N 5/265; H04N 5/2624; H04N 9/76; G06T 5/009; G06T 2207/10016; G06T 5/50; G09G 5/026
(Continued)

(56) References Cited

U.S. PATENT DOCUMENTS

| 6,144,365 A | 11/2000 | Young |
| 7,813,577 B2 | 10/2010 | Kotani |

(Continued)

FOREIGN PATENT DOCUMENTS

| EP | 1199888 | 4/2002 |
| EP | 2498499 | 9/2012 |

(Continued)

OTHER PUBLICATIONS

Wang, Hong Yong et al "A Method of Generating Global View Texture Images in 3D Face Modeling" IEEE 2nd International Conference on Information Science and Engineering, Dec. 4-6, 2010.

(Continued)

*Primary Examiner* — William Tran

(57) ABSTRACT

Input video signals characterized by a source electro-optical transfer function (EOTF) are to be blended and displayed on a target display with a target EOTF which is different than the source EOTF. Given an input set of blending parameters, an output set of blending parameters is generated as follows. The input blending parameters are scaled by video signal metrics computed in the target EOTF to generate scaled blending parameters. The scaled blended parameters are mapped back to the source EOTF space to generate mapped blending parameters. Finally the mapped blending parameters are normalized to generate the output blending parameters. An output blended image is generating by blending the input video signals using the output blending parameters. Examples of generating the video signal metrics are also provided.

20 Claims, 2 Drawing Sheets

(51) Int. Cl.
*G06T 5/00* (2006.01)
*G06T 5/50* (2006.01)
*G09G 5/02* (2006.01)
*H04N 9/76* (2006.01)
*G11B 27/036* (2006.01)

(52) U.S. Cl.
CPC ............ *G11B 27/036* (2013.01); *H04N 9/76* (2013.01); *G06T 2207/10016* (2013.01)

(58) Field of Classification Search
USPC .................................................. 386/280, 300
See application file for complete search history.

(56) References Cited

U.S. PATENT DOCUMENTS

| | | | |
|---|---|---|---|
| 8,260,738 B2 | 9/2012 | MacLennan | |
| 8,493,415 B2 | 7/2013 | MacInnis | |
| 8,570,441 B2 | 10/2013 | Nakayama | |
| 8,625,013 B2 | 1/2014 | Jannard | |
| 2002/0149600 A1 | 10/2002 | Van Splunter | |
| 2003/0043390 A1 | 3/2003 | Fritz | |
| 2008/0242955 A1* | 10/2008 | Uutela | A61B 5/021 600/301 |
| 2010/0271512 A1 | 10/2010 | Garten | |
| 2012/0210232 A1 | 8/2012 | Wang | |
| 2012/0287147 A1* | 11/2012 | Brown Elliott | G09G 5/02 345/593 |
| 2014/0002694 A1 | 1/2014 | Levy | |
| 2014/0210847 A1* | 7/2014 | Knibbeler | G09G 5/006 345/589 |
| 2014/0225941 A1 | 8/2014 | Van Der Vleuten | |
| 2015/0245004 A1* | 8/2015 | Guo | H04N 11/20 348/453 |
| 2015/0245050 A1* | 8/2015 | Tourapis | H04N 19/98 375/240.02 |
| 2015/0256860 A1* | 9/2015 | Kunkel | G06T 5/00 348/598 |
| 2016/0150180 A1* | 5/2016 | Kozuka | H04N 5/913 386/254 |
| 2016/0295220 A1* | 10/2016 | Oh | H04N 19/30 |

FOREIGN PATENT DOCUMENTS

| | | |
|---|---|---|
| WO | 2012/012489 | 1/2012 |
| WO | 2014/043005 | 3/2014 |
| WO | 2014/065055 | 5/2014 |
| WO | 2014/130213 | 8/2014 |
| WO | 2014/130343 | 8/2014 |

OTHER PUBLICATIONS

ITU Rec. ITU-R BT. 1886 "Reference Electro-Optical transfer function for Flat Panel Displays used in HDTV Studio Production" Mar. 2011.

SMTE SE 2084:2014 "High Dynamic range EOTF of Mastering Reference Displays".

* cited by examiner

BLENDING IMAGES USING MISMATCHED SOURCE AND DISPLAY ELECTRO-OPTICAL TRANSFER FUNCTIONS

CROSS REFERENCE TO RELATED APPLICATIONS

This application claims the benefit of priority to U.S. Provisional Patent Application Ser. No. 62/059,038, filed on Oct. 2, 2014, which is hereby incorporated herein by reference in its entirety.

TECHNOLOGY

The present invention relates generally to images. More particularly, an embodiment of the present invention relates to blending images when the electro-optical transfer functions (EOTFs) of the source and target displays differ.

BACKGROUND

Video signals may be characterized by multiple parameters, such as bit-depth, color space, color gamut, and resolution. An important aspect of a video signal's characteristic is it dynamic range. Dynamic range (DR) is a range of intensity (e.g., luminance, luma) in an image, e.g., from darkest darks to brightest brights. As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is included herein by reference in its entity, defines the reference EOTF for flat panel displays based on measured characteristics of the Cathode Ray Tube (CRT). Given a video stream, information about its EOTF is typically embedded in the bit stream as metadata.

Most commercially available professional monitors are characterized by relatively low dynamic range (e.g., 100 to 500 nits); however, newer professional monitors, such as those demonstrated by Dolby Laboratories, may allow for displaying signals at much higher dynamic rates (e.g., 1000 nits to 5000 nits, or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety.

As appreciated by the inventors here, content creators may generate content under EOTFs that may not match the EOTF of the target display, hence improved techniques for blending images using mismatched source and target EOTFs are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Given images to be blended using a source EOTF, blending techniques are described herein so that the output blended image is viewed correctly on a target display with a target EOTF which is different than the source EOTF.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to blending techniques when the electro-optical transfer functions (EOTFs) of the source and target displays differ. Input video signals characterized by a source EOTF are to be blended and displayed on a target display with a target EOTF which is different than the source EOTF. In an embodiment, given an input set of blending parameters, an output set of blending parameters is generated as follows. The input blending parameters are scaled by video signal metrics coded in the target EOTF to generate scaled blending parameters. The scaled blended parameters are mapped back to the source EOTF space to generate mapped blending parameters. Finally the mapped blending parameters are normalized to generate the output blending parameters. An output blended image is generating by blending the input video signals using the output blending parameters.

In an embodiment, the video signal metrics are generated based on the characteristics of the input video signals, such as their mean or median pixel values, which are next mapped to metrics coded using the target EOTF.

In another embodiment, the input video signals are transformed to the target EOTF and the video signal metrics are generated based on the characteristics of the transformed input video signals.

Content Creation

Figure 1:
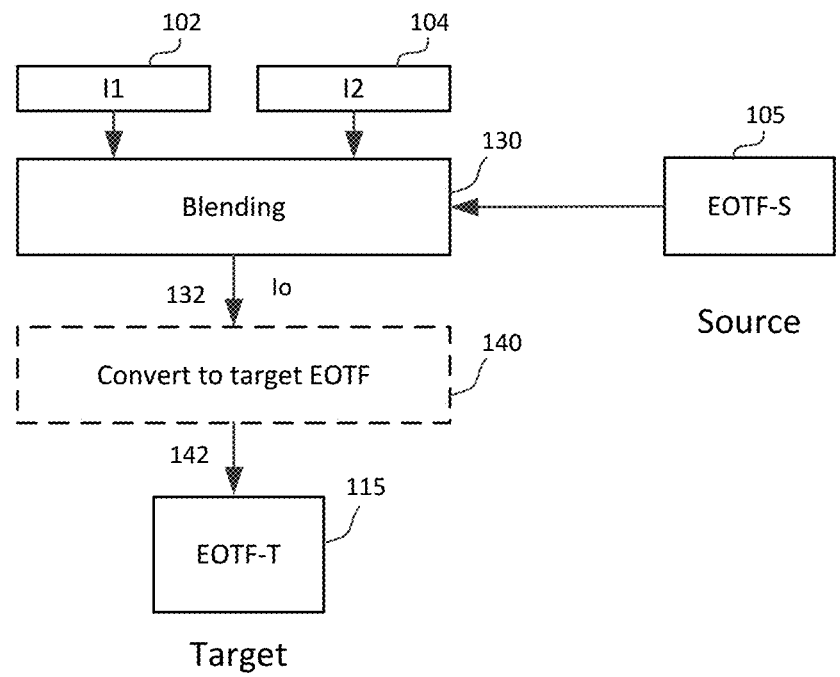
FIG. 1 depicts an example data flow of content creation without blending parameter adjustment.

FIG. 1 depicts an example data flow of content creation during post production. Given two source video clips (102 and 104), an editor may merge them to generate output content (132) to be played together on a target display (115). For example, during blending (130), the editor may use a dissolve (e.g., fade-in or fade-out) or any other blending operation (e.g., alpha blending, logo insertion, and the like).

Traditionally, the editor will edit the clips using a source or reference display (105) that matches the target display characteristics; however, this may not be always the case. For example, the editor may be using a "gamma" display for editing (e.g., a display based on BT.1886), but the target display may be an HDR "perceptually-quantized" (PQ) display (e.g., one based on ST 2084). In such scenarios, before displaying output (132) onto the target display (115), blended output (132) will need to be converted from the source EOTF into the target EOTF; however, the converted blended output (142) may now look completely different than originally intended.

Figure 3:
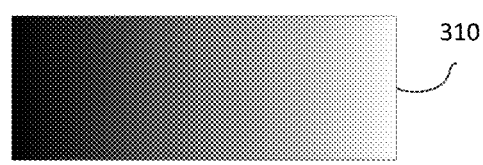
FIG. 3 depicts examples of fade-in from black to white using matching and non-matching EOTFs.
Figure 3:

For example, the top image (310) in FIG. 3 depicts a black-to-white transition as will be viewed when the EOTF of the source display (EOTF-S) matches the EOTF of the target display (EOTF-T). Consider now, without limitation, the case where image (310) was blended on a gamma display but needs to be displayed on a PQ display. Translating image (310) from gamma space to PQ space will yield an image closer to image (320), shown at the bottom of FIG. 3. As depicted in FIG. 3, because of the mismatched EOTFs, the blend of the two images may not appear as originally intended. In an embodiment, the blending parameters for blending the source clips (102, 104) are modified in response to the target EOTF so that the output image (132) is displayed correctly onto the target display.

Blend Matching

Figure 2:
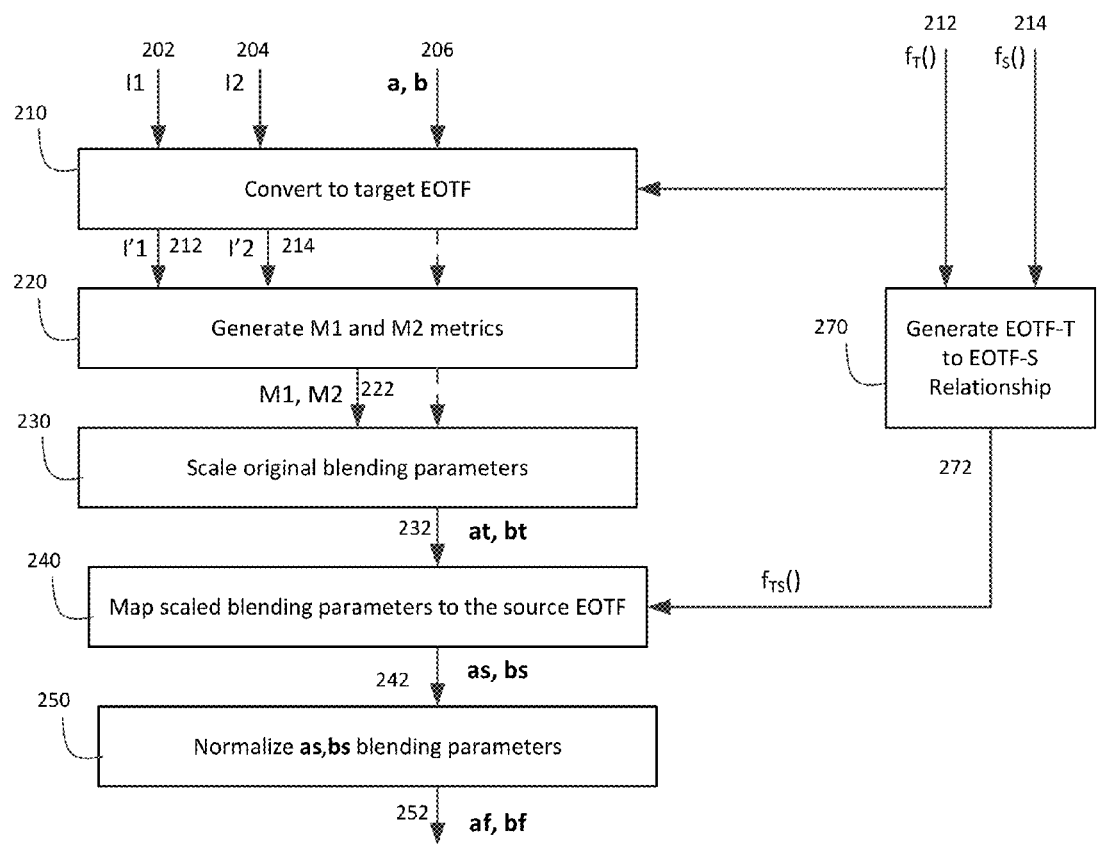
FIG. 2 depicts an example process for generating blending parameters according to an embodiment of the present invention.

FIG. 2 depicts an example of a processing pipeline for image blending according to an embodiment. Without loss of generality denote as $y(n)=f_s(x(n))$ (214) and $y(n)=f_T(x(n))$ (212) the source and target EOTF functions respectively. For example, without limitation, these can be linear, gamma-based (e.g., based on BT.1886 and the like), or perceptually-quantized (PQ) based (e.g., based on ST2084 and the like).

Denote as $I_1$ (202) and $I_2$ (204) two video clips to be merged together, wherein each video clip is represented by a sequence of frames (e.g., $I_1=[f_1, f_2, \ldots, f_M]$). For example, $I_1$ may be merged with $I_2$ using a dissolve, alpha blending, or any other video editing operation. Let a and b (206) denote blending parameter vectors. These vectors represent the desired scaling factors for merging the two source images. For example, $a=[a_1, a_2, a_3, \ldots, a_N]$ (e.g., $a=[0, 0.2, 0.4, 0.8, 1]$) may define the blend coefficients of $I_1$ into $I_2$. Similarly, $b=[b_1, b_2, b_3, \ldots, b_N]$(e.g., $b=[1, 0.7, 0.4, 0.3, 0]$) may define the blend coefficients of $I_2$ into $I_1$. In some embodiments, blending may be characterized by a single vector a, that is, it may be implied that b is a known function of a (e.g., $b=1-a$, or $b_i=1-a_i$, for $i=1, 2, \ldots, N$). Then, given matching source and display EOTFs (e.g., $f_T(x(n))=f_s(x(n))$), the blending operation may be defined as generating blended output $I_O$ given by $$I_O = I_1 * a + I_2 * b. \quad (1)$$

If $f_T(x(n)) \neq f_s(x(n))$, then additional steps, as depicted in FIG. 2, may be applied to generate output blending parameters (252) that take into consideration the mismatched EOTFs. First, as depicted in step (210), all inputs are translated from the source EOTF into the target EOTF. For example, if the source EOTF is gamma-based and the destination EOTF is PQ based, then for $I_1$, step (210) may include the following steps:

a) Linearize $I_1$ by applying a gamma-to-linear transform according to the source EOTF.
b) Apply a linear-to-PQ transform to the linear output of step a) to generate a PQ-coded output ($I_1'$) according to the target EOTF.

More generally, these steps may be expressed as:

$$T=f_s^{-1}(I_1),$$

$$I_1'=f_T(T), \quad (2)$$

where $I_1'$ (212) denotes the first input under the target EOTF and $f_s^{-1}$ denotes the function to generate linear pixel values based on the source EOTF. Similar steps may also be performed to compute $I_2'$ (214) representing $I_2$ in the target EOTF. In some embodiments, the linearization steps may be skipped if the input samples are already in the linear domain. In some embodiments, the two steps of equation (2) may also be combined to generate a direct mapping between the two EOTFs (e.g., $I_1'=f_{ST}(I_1)$), which may be implemented using a look-up table.

In an embodiment, in step (220), metrics M1 and M2 (222) related to the adjusted sources (212, 214) are computed. These metrics characterize the two inputs ($I_1'$ and $I_2'$) and are used to modify the original blending parameters. For example, in an embodiment, M1 and M2 may be determined as a function of the luminance values of $I_1'$ and $I_2'$. Without limitation, examples of such functions may include computing the minimum, average, median, or maximum luminance. Hence, without loss of generality, in an embodiment, let $$M1=f_{M1}(I_1'),$$

$$M2=f_{M2}(I_2'), \quad (3)$$

where $f_{M1}$ and $f_{M2}$ denote the metric functions (e.g., min, mean, median, maximum, and the like). In some embodiments M1 and M2 may be based on the same function (e.g., the median). In other embodiments M1 and M2 may be computed using different functions. For example, M1 may be a function of the minimum luminance and M2 may be a function of the maximum luminance. M1 and M2 may be computed based on all the frames of the two inputs or based on a selected subset of the frames or pixel regions within the frames. In some embodiments, M1 and M2 may be received through the input video metadata or they may be computed using related metadata (e.g., the min, medium, or maximum luminance of a frame or a scene).

Given the metrics M1 and M2, in step (230) scaled blending coefficients (232) are computed. Assuming $M2>M1\geq0$, purpose of this step is to map the input blending parameters from an original range (e.g., $(\min(a_i), \max(a_i))$, for $i=1, 2, \ldots, N$) to a target range (e.g., (M1, M2)). In an embodiment, without loss of generality, assuming $\min(a_i)=\min(b_i)=0$ and $\max(a_i)=\max(b_i)=1$, it can be easily shown that such a mapping (e.g., from (0,1) to (M1,M2)) corresponds to:

$$at=(a*(M2-M1))+M1,$$

$$bt=(b*(M2-M1))+M1, \quad (4)$$

where at and bt denote the scaled blending parameter vectors (232).

Given the source and destination EOTFs, as depicted in step (270), one may derive a mapping that maps values from the target EOTF into values to the source EOTF. For example, if x denotes a value in the target EOTF one may derive the corresponding y value in the source EOTF as follows:

$$t = f_T^{-1}(x),$$

$$y = f_s(t), \quad (5)$$

or the two operations can be combined and expressed as $y=f_{TS}(x)$ (272). In some embodiments, $f_{TS}(x)$ may be represented as a look-up table (LUT). Note that the $f_{TS}$ function needs to be computed only once. A content creation tool may store in memory a variety of EOTF-T-to-EOTF-S mapping functions related to the most popular EOTFs.

Given the $f_{TS}(x)$ function and the scaled blending coefficients at and bt, a set of new blending parameters (242) is generated as $$as = f_{TS}(at),$$

$$bs = f_{TS}(bt). \quad (6)$$

These as and bs blending parameters may not be within the allowed range of the editing tools (e.g., (0, 1)), hence in an embodiment, they may need to be normalized. In an embodiment, in step (242), the output blending parameters (252) may be computed as $$af = \frac{as - \min(as)}{\max(as) - \min(as)}, \quad (7)$$

$$bf = \frac{bs - \min(bs)}{\max(bs) - \min(bs)}.$$

Given the af and bf blending parameters of equation (7), in an embodiment, the final blend may be computed as $$I_O = I_1 * af + I_2 * bf.$$

The proposed method provides a mathematical model of automated image blending under mismatched source and display EOTFs that appears to be more efficient than manual and operator-dependent blending. In an embodiment, given one set of alpha-channel blending parameters for one EOTF, the technique can be applied to automatically generate corresponding blending parameters for other EOTFs. This may be advantageous for un-supervised operations, such as logo insertion, alpha blending, and cross fades.

In other embodiments, the computational complexity of the above pipeline may be reduced at the expense of reduced blend matching between the desired and the final blended images. As discussed earlier, in step (210), the input video signals (202, 204) are transformed to the target EOTF so that metrics M1 and M2 may be generated from the transformed signals (212, 214) to scale the input blending parameters. In an embodiment, the metrics may be computed directly from the input video signals. Then, only the two metrics need to be transformed to the target EOTF, thus significantly reducing the computation. Hence, instead of computing steps (210) and (220), one first computes $$MS1 = f_{M1}(I_1),$$

$$MS2 = f_{M2}(I_2). \quad (8)$$

Then, the MS1 and MS2 values may be translated to the target EOTF using equation (2), for example, given MS1:

$$T = f_s^{-1}(MS1),$$

$$M1 = f_T(T),$$

$$\text{or } M1 = f_{sT}(MS1)), \quad (9)$$

The same steps can be used to compute M2 from MS2. Given M1 and M2, the remaining steps (230-250) for computing the output blending parameters remain the same.

In some embodiments, the process of generating the M1 and M2 metrics may also be aided or adjusted by user control. For example, a user may completely bypass steps (210) and (220) and manually feed predetermined M1 and M2 values (or MS1 and MS2 values). Alternatively, a user may desire to manually adjust the metrics computed via equations (3) or (8) before applying the scaling step (230).

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating video blending, such as those described herein. The computer and/or IC may compute any of a variety of parameters or values that relate to video blending processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to video blending as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to video blending are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for blending video images, the method comprising:
   accessing a first video signal (202), a second video signal (204), and input blending parameters (206), wherein the first and second video signals are coded using a source electro-optical transfer function (EOTF);
   wherein the input blending parameters comprise a first input blending parameter for scaling the first video signal in a first blending operation that blends the first video signal and the second video signal;
   wherein the input blending parameters comprise a second input blending parameter, distinct from the first input blending parameter, for scaling the second video signal in the first blending operation that blends the first video signal and the second video signal;
   wherein the first blending operation is for a display associated with the source EOTF;
   accessing video signal metrics (222), wherein the video signal metrics are coded using a target EOTF;
   generating scaled blending parameters (232) in response to the video signal metrics and the input blending parameters; and
   generating mapped blending parameters (242) in response to the scaled blending parameters, the source EOTF, and the target EOTF;
   wherein the mapped blending parameters comprise a first mapped blending parameter for scaling the first video signal in a second blending operation that blends the first video signal and the second video signal;
   wherein the mapped blending parameters comprise a second mapped blending parameter, distinct from the first mapped blending parameter, for scaling the second video signal in the second blending operation that blends the first video signal and the second video signal;
   wherein the second blending operation is for a target display associated with the target EOTF for the target display associated with the target EOTF;
   wherein the target EOTF with which the second blending operation is associated is different from the source EOTF with which the first blending operation is associated.

2. The method of claim 1, further comprising generating normalized blending parameters (252), by scaling the mapped blending parameters to be within a predefined range.

3. The method of claim 2, further comprising blending the first video signal and the second video signal by using the mapped blending parameters or the normalized blending parameters to generate a blended output video signal.

4. The method of claim 1, where accessing the video metrics further comprises:
   generating a first transformed and a second transformed video signals (212, 214) in response to the target EOTF; and
   generating the video signal metrics (222) in response to the transformed first and second video signals.

5. The method of claim 1, where accessing the video metrics further comprises:
   generating preliminary video signal metrics in response to the first and second video signals; and
   converting the preliminary video signal metrics to the video signal metrics in response to the target EOTF.

6. The method of claim 4, wherein a first video signal metric comprises a function of the luminance of pixel values in the first transformed video signal.

7. The method of claim 4, wherein a second video signal metric comprises a function of the luminance of pixel values in the second transformed video signal.

8. The method of claim 5, wherein generating a first preliminary video signal metric comprises computing a function of the luminance of pixel values in the first video signal.

9. The method of claim 5, wherein generating a second preliminary video signal metric comprises computing a function of the luminance of pixel values in the second video signal.

10. The method of claim 1, wherein generating the scaled blending parameters comprises computing $$at = (a*(M2-M1)) + M1,$$

where M1 and M2 denote first and second video signal metrics, a denotes a vector of the input blending parameters, and at denotes a vector of the scaled blending parameters.

11. The method of claim 1, wherein generating a mapped blending parameter y given a scaled blending parameter x comprises computing $$t = f_T^{-1}(x),$$

$$y = f_s(t),$$

wherein t denotes a temporary value, $f_s$ denotes the source EOTF function and $f_t^{-1}$ denotes a function of the target EOTF function.

12. The method of claim 1, wherein generating a mapped blending parameter vector as given a scaled blending parameter vector at comprises computing $$as = f_{TS}(at),$$

where $f_{TS}$ represents a function of input values in the target EOTF mapped into output values in the source EOTF.

13. The method of claim 12, wherein the $f_{TS}$ function is implemented via a look-up table.

14. The method of claim 2, wherein the normalized blending parameters are within 0 and 1, with the 0 and 1 values included.

15. The method of claim 2, wherein blending the first video signal and the second video signal comprises computing $$I_O = I_1 * af + I_2 * bf,$$

wherein $I_O$ denotes the blended output video signal, $I_1$ denotes the first video signal, $I_2$ denotes the second video signal, and af and bf denote vectors of the mapped blending parameters or the normalized blending parameters.

16. The method of claim 1, wherein the source and the target EOTFs are different.

17. The method of claim 4, wherein generating the first transformed video signal comprises:
   linearizing the first video signal using the source EOTF to generate a temporary signal; and generating the first transformed video signal by applying the target EOTF to the temporary signal.

18. The method of claim 1, wherein accessing the video signal metrics further comprises computing the video signal metrics based on metadata received for the first and second video signals.

19. An apparatus comprising a processor and configured to perform the method recited in claim 1.

20. A non-transitory computer-readable storage medium having stored thereon computer-executable instructions for executing a method with a processor in accordance with claim 1.

* * * * *